United States Patent
Mitrache et al.

(10) Patent No.: US 12,244,459 B1
(45) Date of Patent: Mar. 4, 2025

(54) DYNAMIC NETWORK RECONFIGURATION

(71) Applicant: Microsoft Technology Licensing, LLC, Redmond, WA (US)

(72) Inventors: Laura Mitrache, Bellevue, WA (US); Martin Tomka, Prague (CZ); Juraj Blaek, Prague (CZ); Stephen Toub, Winchester, MA (US); Andrey Noskov, Prague (CZ); Martin Taillefer, Redmond, WA (US); Scott Allen Thurlow, Bellevue, WA (US); Lukas Barton, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/239,909

(22) Filed: Aug. 30, 2023

(51) Int. Cl.
*H04L 41/0816* (2022.01)
*H04L 41/0604* (2022.01)
*H04L 41/16* (2022.01)

(52) U.S. Cl.
CPC ...... *H04L 41/0816* (2013.01); *H04L 41/0627* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 9,876,673 B2 * | 1/2018 | Margalit | ............ | H04L 41/0631 |
| 11,375,255 B1 * | 6/2022 | Ramalingam | ......... | H04L 41/142 |
| 2012/0124431 A1 * | 5/2012 | Bauer | ............... | H04L 69/28 |
| | | | | 714/E11.067 |
| 2012/0257540 A1 * | 10/2012 | Ichikawa | ............... | H04L 41/12 |
| | | | | 370/254 |
| 2012/0290723 A1 * | 11/2012 | Manikowski | ........... | G06F 9/505 |
| | | | | 709/224 |

(Continued)

OTHER PUBLICATIONS

Sri Raj Paul, et al., "Integrating Inter-Node Communication with a Resilient Asynchronous Many-Task Runtime System", retrieved from << https://www.osti.gov/servlets/purl/1831760/ >>, Nov. 13, 2020, 32 pages.

(Continued)

*Primary Examiner* — Joshua Joo
(74) *Attorney, Agent, or Firm* — Ogilvie Law Firm

(57) ABSTRACT

Some embodiments automatically and proactively adjust network device configuration settings during network operation, based on correlations between device performance and device configuration. Correlations are computed using statistics routines or computed by a machine learning module. Some embodiments share adjusted configuration values via a cache, and some persist adjusted values through an application restart. In some embodiments, the cache is hierarchical and different kinds of reconfiguration data are shared at different levels. In some embodiments, the configuration value is shared only between application instances that have sufficiently similar contexts. Some embodiments detect a correlation loss and fall back to a known good configuration setting or a default configuration setting. Some embodiments optimize network internode communications by making dynamic adjustments which are not available from static configuration settings or from static configuration rules.

20 Claims, 3 Drawing Sheets

(56) References Cited

U.S. PATENT DOCUMENTS

| | | | |
|---|---|---|---|
| 2013/0212279 A1* | 8/2013 | Dutta | G06F 9/5077 |
| | | | 709/226 |
| 2015/0213106 A1* | 7/2015 | Kunde | G06F 9/45558 |
| | | | 718/1 |
| 2016/0041952 A1* | 2/2016 | Malladi | G06F 40/143 |
| | | | 715/239 |
| 2017/0201598 A1* | 7/2017 | Floyd | G06F 16/285 |
| 2017/0310542 A1* | 10/2017 | Nair | H04W 24/08 |
| 2018/0285086 A1 | 10/2018 | O'Malley et al. | |
| 2020/0177468 A1* | 6/2020 | Quachtran | G06N 3/088 |
| 2021/0240364 A1* | 8/2021 | Halim | G06F 3/0679 |
| 2021/0250254 A1* | 8/2021 | Bentley | G06F 8/65 |
| 2021/0255769 A1* | 8/2021 | Beloussov | G06N 5/025 |
| 2021/0351973 A1* | 11/2021 | Ford | H04L 43/067 |
| 2022/0050767 A1 | 2/2022 | Alt | |
| 2022/0086249 A1* | 3/2022 | Parvataneni | H04W 8/26 |
| 2022/0206783 A1* | 6/2022 | Silakov | G06F 11/3409 |
| 2022/0398183 A1* | 12/2022 | Kerlin | G06F 11/302 |
| 2023/0028837 A1* | 1/2023 | Wang | H04L 41/0876 |
| 2023/0164065 A1 | 5/2023 | Vasseur | |
| 2023/0224160 A1* | 7/2023 | Sanders | H04L 9/0819 |
| | | | 726/4 |

OTHER PUBLICATIONS

"Guide to Microservices Resilience Patterns", retrieved from << https://www.jrebel.com/blog/microservices-resilience-patterns >>, Apr. 1, 2020, 10 pages.
"Retry pattern", retrieved from << https://learn.microsoft.com/en-us/azure/architecture/patterns/retry >>, no later than Jul. 19, 2023, 8 pages.
"Computer network", retrieved from << https://en.wikipedia.org/wiki/Computer_network >>, Aug. 10, 2023, 25 pages.
International Search Report and Written Opinion received for PCT Application No. PCT/US2024/038438, Oct. 31, 2024, 15 pages.

* cited by examiner

ASPECTS OF SOME DYNAMIC RECONFIGURATION EMBODIMENTS

| CONFIGURATION ITEM / PERFORMANCE: HISTORY TIME INTERVAL 402 / 404 |||
|---|---|---|
| PERFORMANCE MEASURE 406 | MACHINE LEARNING MODULE 408 ||
| DYNAMIC ADJUSTMENT 410 | ALERT 412 | KNOWN GOOD VALUE 414, 416 |
| DEFAULT VALUE 418, 416 | RULE 420 | CORRELATION LOSS 422 |
| HEALTH 424: METRIC 426, MEASUREMENT DATA 428 | LATENCY 430 DATA 432 ||
| APPLICATION CONTEXT 434: LOAD 436, ENVIRONMENTAL VALUE 438, TEMPORAL LOCATION 440, SPATIAL LOCATION 442 |||
| BACK PROPAGATION NEURAL NETWORK 444, 408 | TARGET VALUE 446, 416 ||
| PERFORMANCE LOSS 448 RESPONSE ACTION 454 METRIC 452 | RESTART 490 ||
| CONTEXT 434: SIMILARITY MEASURE 456, SUFFICIENT SIMILARITY 458 |||
| CONTAINER 460 | POD 462 | DATA CENTER 464 / APPLICATION TYPE 466 |
| HIERARCHY 468 LEVEL 470 | CLUSTER 472 | AGGREGATION 474 |
| PERCENTAGE 476 | SUPERVISED LEARNING 478 | INSTANCE 480 |
| SERVICE 482 | SELECTION ORDER 484 | REQUEST 486 / FAILSAFE 488 |

Fig. 4

SOME ASPECTS AND EXAMPLES OF CONFIGURATION ITEMS 134

| MAX ENDPOINTS HEDGING VALUE 502, 504 | RETRY INTERVAL 508, 510 |
|---|---|
| ENDPOINT ORDER HEDGING VALUE 506, 504 | MAX RETRIES 528, 510 |
| ENDPOINT 512 / POLICY 530 / TIMEOUT 516 | RETRY SWITCH VALUE 514, 510 |
| BULKHEAD 518 MAX CONCURRENT REQUESTS 520 | CIRCUIT BREAKER 524 THRESHOLD 526 |
| CIRCUIT BREAKER POLICY PARAMETER 522 | |

Fig. 5

DYNAMIC NETWORK RECONFIGURATION

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices are developed by people who are known as developers, programmers, engineers, or coders, for example, they are referred to collectively here as "developers". As they develop software, developers interact with software code and other digital resources, and with source code editors, compilers, debuggers, profilers, version control tools, and various other software development tools in a development environment. After software is written and tested, it is sometimes deployed to a wider computing environment, such as a beta test environment or a production environment.

The various computing environments in which software is developed, tested, deployed, maintained, commercially utilized, or otherwise runs, often includes a network of connected or connectable physical devices, virtual machines, or both. A network may include constituent subnetworks, which are treated as networks in their own right. Within a network, instances of a given software program, and other software programs, often communicate with one other, or attempt to communicate with one another, or make computational decisions as to when, how, or even whether to communicate amongst themselves or with external devices.

Each computing environment usually also includes resources, e.g., source code, databases, images, interfaces, credentials, repositories, and more. Each computing environment also includes settings, e.g., environment variables, search paths, security permissions, user preferences, tool flags, and more.

Terminology varies, but the process of providing a device in a computing environment is often described as deploying or provisioning the device. Configuring the device is at least part of deploying or provisioning it. Depending on the situation, configuring a device includes installing software on the device or verifying that particular software is installed, installing resources or verifying that particular resources are installed, assigning values to settings or confirming that particular values have been assigned, or a mixture of the foregoing.

Billions of devices of various kinds, configured in different ways, have been deployed or utilized in a wide variety of computing environments, going back to at least the 1958 release of the first commercial modem for computers. However, improvements in device configuration technology are still possible, particularly in technology for configuring network devices.

SUMMARY

Some embodiments improve device configuration technology by automatically and proactively adjusting network device configuration settings during network operation, based on computed correlations between device performance and device configuration. Some embodiments share dynamically adjusted configuration values between nodes, via a cache. Some embodiments persist dynamically adjusted values through a restart. Some embodiments detect a loss (partial or full) of the adjustment-performance correlation, and in response fall back to a known good configuration setting value, or a default configuration setting value. Some embodiments optimize internode communications in a network by making dynamic adjustments which are not available from static configuration settings or static configuration rules. The foregoing embodiments are only some examples, other network (re)configuration functionality is also described herein.

Some embodiments include or use a method of reconfiguring an application on a node in a network. The application has a dynamically adjustable configuration item. The method includes automatically and proactively: obtaining a configuration item history containing values of the dynamically adjustable configuration item over a configuration item history time interval; getting a performance history containing values of a performance measure over a performance history time interval, the performance history time interval overlapping the configuration item history time interval; computing an item-performance correlation value based on at least a portion of the configuration item history and at least a portion of the performance history; and in response to the item-performance correlation value, dynamically adjusting the dynamically adjustable configuration item.

Some embodiments include or use a computing system which is configured to reconfigure an application on a node in a network. The computing system includes: a digital memory; a processor set including at least one processor, the processor set in operable communication with the digital memory; a dynamically adjustable configuration item of the application; an item history interface which provides access to a configuration item history containing values of the dynamically adjustable configuration item; a performance history interface which provides access to a performance history containing values of a performance measure; and an application reconfiguration software which computes an item-performance correlation value based on at least a portion of the configuration item history and at least a portion of the performance history, and in response to the item-performance correlation value dynamically adjusts the dynamically adjustable configuration item of the application.

Some embodiments include or use a computer-readable storage device configured with data and instructions which upon execution by a processor cause a computing system to perform a method of reconfiguring an application on a node in a network. The application has a dynamically adjustable configuration item. The method includes: computing an item-performance correlation value based on at least a portion of a configuration item history and at least a portion of a performance history; and in response to the item-performance correlation value, dynamically adjusting the dynamically adjustable configuration item.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 4 is a block diagram illustrating some additional aspects of dynamic network reconfiguration functionality in various embodiments;

FIG. 5 is a block diagram illustrating some aspects and examples of network configuration items;

DETAILED DESCRIPTION

Overview

Figure 1:
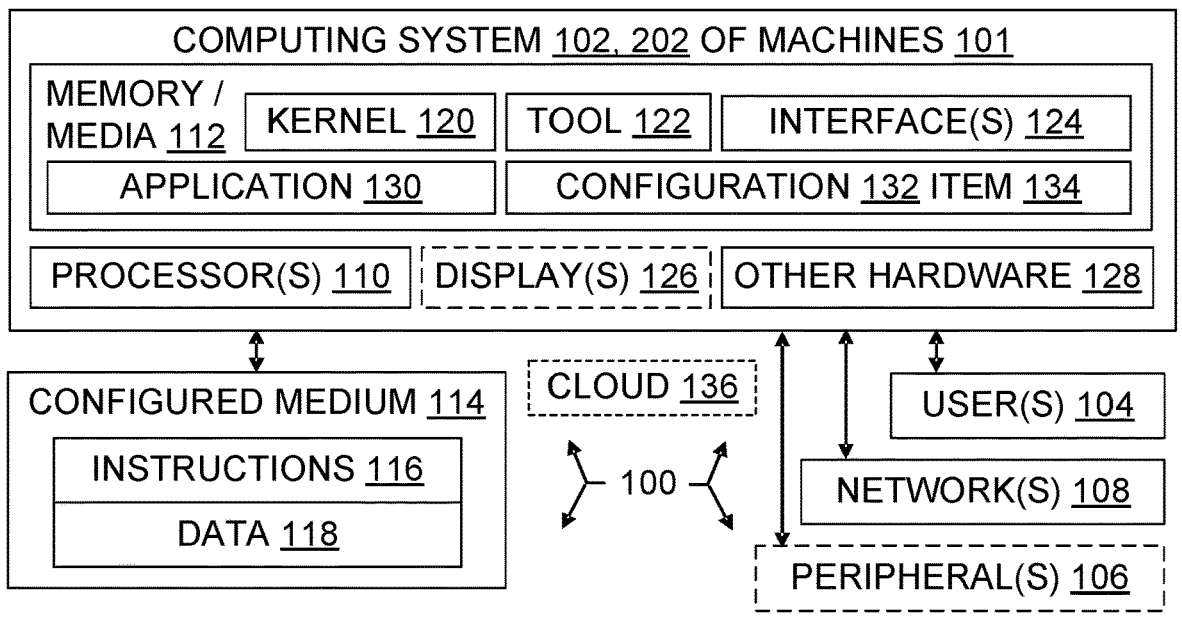
FIG. 1 is a diagram illustrating aspects of computer systems and also illustrating configured storage media, including some aspects generally suitable for systems which provide dynamic network reconfiguration functionality.

Some teachings described herein were motivated by technical challenges faced during efforts to improve technology for resilient communications in network computing systems. In particular, challenges were faced during efforts to improve technology to implement resilience strategies, such as retry, timeout, circuit breaker, bulkhead, fallback, and hedging policies. These challenges were motivations, but teachings herein are not limited in their scope or applicability to the particular motivational challenges.

One technical challenge driven by communications resilience improvement efforts is how to choose suitable communications parameters such as endpoint priorities, retry intervals, and timeout intervals. Different network nodes are deployed to different environments, and parameters that work well in one environment are not necessarily optimal in a different environment.

Some embodiments taught herein meet this challenge by operating on a dynamic basis, instead of relying solely on an initial configuration of software. This dynamic adjustment capability stems from an insight that differences across environments and differences across time can be handled in a unified manner. In addition to the challenge of differences between one environment and another environment, or between locations within an environment, communicating nodes also face the challenge of differences over time at a particular location within a particular environment. A dynamic adjustment functionality like the technologies described herein addresses all these challenges by using dynamic network reconfiguration. When a node is dynamically reconfigurable, it optimizes performance not only with respect to different environments and different locations but also with respect to a given environment location at different times.

Some embodiments described herein utilize or provide technology which reconfigures an application on a node in a network. The application has a dynamically adjustable configuration item. The embodiments compute an item-value-versus-performance-value correlation value (a.k.a. item-performance correlation) which is based on at least a portion of a configuration item history and at least a portion of a performance history. In response to this item-performance correlation, some embodiments dynamically adjust the dynamically adjustable configuration item to optimize performance. In these embodiments, this dynamic reconfiguration functionality has the technical benefit of making more configuration adjustments to perform performance optimization, by making configuration adjustments at times, at locations, or in environments, in which the optimizations would not otherwise have occurred.

As one of many examples that will become apparent in view of the teachings provided herein, assume an application in a network is designed to obtain certain data and has a list of endpoints that are potential sources of that data. An endpoint order configuration item specifies in a list an order in which the application tries to contact different endpoints to obtain the data. That is, the application first tries the endpoint that is listed first in the endpoint order configuration item. If the data is not obtained, the application tries the endpoint that is listed second in the endpoint order configuration item, and so on through the listed endpoints in turn, until the data is obtained.

Three approaches to configuration are denoted here as fully static, static rule, and dynamic. Unless stated otherwise, all embodiments taught herein utilize or include dynamic configuration functionality, alone or in conjunction with initial configurations or rule-based configurations, or both.

Under a fully static configuration, the example endpoint order configuration item does not change from its initial value. Of course, a developer can manually intervene to change any value in a computing system, at least in theory, but a basic purpose of most if not all software is to produce desired results with less manual effort, so manual intervention is presumptively not a part of any embodiment.

A fully static configuration is not optimal in some situations. For instance, suppose the first endpoint listed is heavily loaded, or undergoing maintenance, or subject to the highest service fees, and the second endpoint listed does not have these disadvantages. The fully static configuration will nonetheless continue trying to use the first endpoint before it turns—if it ever does—to the more advantageous second endpoint.

Under a static rule configuration, the endpoint order configuration item is subject to change from its initial value, but any change is based on a static rule. For instance, a static rule may specify that after an attempt to get the data from an endpoint fails, that endpoint is moved to the end of the list or it is assigned a different order index.

This static rule configuration is an improvement over the fully static configuration. Consider a fully static configuration in a situation where the data is downloaded in chunks separated by pauses, the first endpoint fails to provide the first chunk, the first chunk is then provided by the second endpoint, a pause occurs, the first endpoint fails to provide the second chunk, and the second chunk is then provided by the second endpoint. If the static rule configuration was used instead of the fully static configuration, the first endpoint would be moved to the end of the list after the failed attempt to get the first chunk from the first endpoint. As a result, the formerly first endpoint would be skipped and the second chunk would be downloaded from the formerly second endpoint without wasting time on the formerly first endpoint and the consequent failure. An intent is to ensure sequential attempts of using the configuration will use the updated version according to the static rule, instead of the of the initial value that would be preserved by a fully static configuration.

However, dynamic configuration embodiments herein improve on both fully static configurations and static rule configurations, by providing more optimizations. As discussed above, a fully static configuration fails to provide optimizations when conditions change after the application starts running. Configuration optimization opportunities are missed.

Similarly, a static rule configuration fails to provide optimizations when conditions change in a way not recognized by the rule. For instance, in the situation described above where data is downloaded in chunks separated by pauses, suppose the attempt to download the first chunk from the first endpoint fails due to a transitory and relatively rare circumstance, such as the first endpoint rebooting or the first endpoint receiving extra load during a spike that occurs weekly. Once the transitory and rare circumstance has passed, the first endpoint again becomes a better performance choice than the second endpoint.

In some embodiments, a dynamic configuration learns the weekly spike schedule and orders the endpoints accordingly to use the first endpoint when no spike is expected and otherwise use the second endpoint. In some embodiments, a dynamic configuration assesses the endpoints across more than one failure to obtain the data, so the occasional reboot of the first endpoint does not by itself relegate the first endpoint to the end of the order.

Some embodiments monitor the performance measure before a dynamic adjustment to configuration and after the dynamic adjustment, and then, in response to a result of the monitoring at least partially reverse the dynamic adjustment, or repeat the dynamic adjustment, or increase the dynamic adjustment. This provides the technical benefit of tailoring a sequence of dynamic adjustments based on the performance changes they evidently provide.

For example, suppose a max concurrent requests configuration item specifies a maximum number of concurrent requests allowed to an application that is trying to reach at least one endpoint of a set of endpoints, and suppose the max concurrent requests configuration item value is adjusted dynamically by increasing it from three to five. In one situation, monitoring finds that throughput decreases after the adjustment, so the embodiment reverses the dynamic adjustment by decreasing the max concurrent requests configuration item value from five to four. In another situation, throughput increases after the adjustment, so the embodiment repeats the dynamic adjustment in another node by setting the other node's max concurrent requests configuration item value to five. In yet another situation, throughput increases after the adjustment, so the embodiment increases the dynamic adjustment by increasing the max concurrent requests configuration item value from five to six. Some embodiments in some scenarios increase the dynamic adjustment to more nodes in a scoped group (e.g., cluster, data center); some decrease the allocation % of the change.

In some embodiments, dynamically adjusting the dynamically adjustable configuration item includes selecting a dynamic adjustment value and adjusting the dynamically adjustable configuration item to match the selected dynamic adjustment value, and the selecting is performed at least in part by a machine learning module. This provides the technical benefit of providing configuration optimizations in situations which are not covered by any predefined rules, including situations for which no rule is known.

For example, in some embodiments a dynamic configuration machine learning module learns the weekly spike schedule noted above, and orders the endpoints accordingly to use the first endpoint when no spike is expected and otherwise use the second endpoint. This learning and the corresponding dynamic adjustment occur even in the absence of any predefined rule for spike detection.

Some embodiments persist an application's dynamically adjusted reconfiguration information across a restart of the application, and utilize at least a portion of the persisted reconfiguration information to configure or reconfigure the application after the restart. This provides the technical benefit of increased efficiency, by avoiding repetition of a set of dynamic adjustments that led to the persisted reconfiguration information. That is, the application avoids the computational cost of starting reconfiguration from scratch after the restart.

Some embodiments persist an application's dynamically adjusted reconfiguration information in a reconfiguration data cache which is shared by at least one of: application instances which have the same application context, or application instances which have sufficiently similar application contexts according to a predefined measure of sufficiency under a specified application context similarity measure. This provides the technical benefit of increased efficiency, because the other instances avoid repeating a set of dynamic adjustments that led to the shared reconfiguration information. That is, the other application instances receive the benefit of the shared reconfiguration data while avoiding the computational costs of calculating the interim reconfiguration data.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services, such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside, when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud or the Internet. In particular, dynamic network reconfiguration functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience, inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More About Systems

Figure 2:
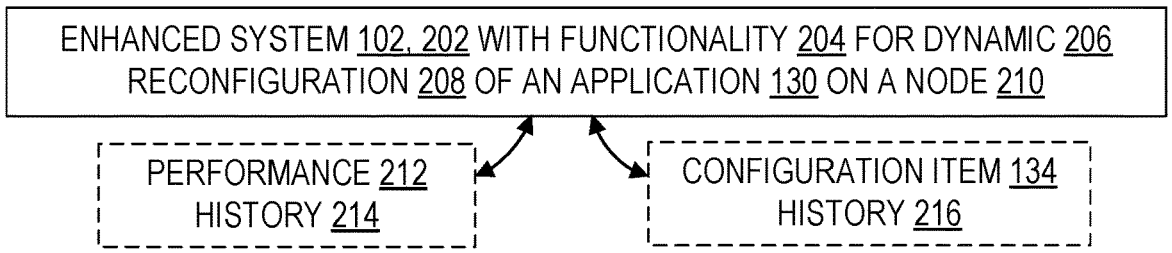
FIG. 2 is a block diagram illustrating an enhanced system configured with dynamic network reconfiguration functionality.

FIG. 2 illustrates a computing system 102 configured by one or more of the dynamic network reconfiguration enhancements taught herein, resulting in an enhanced system 202. In some embodiments, this enhanced system 202 includes a single machine, a local network of machines, machines in a particular building, machines used by a particular entity, machines in a particular data center, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
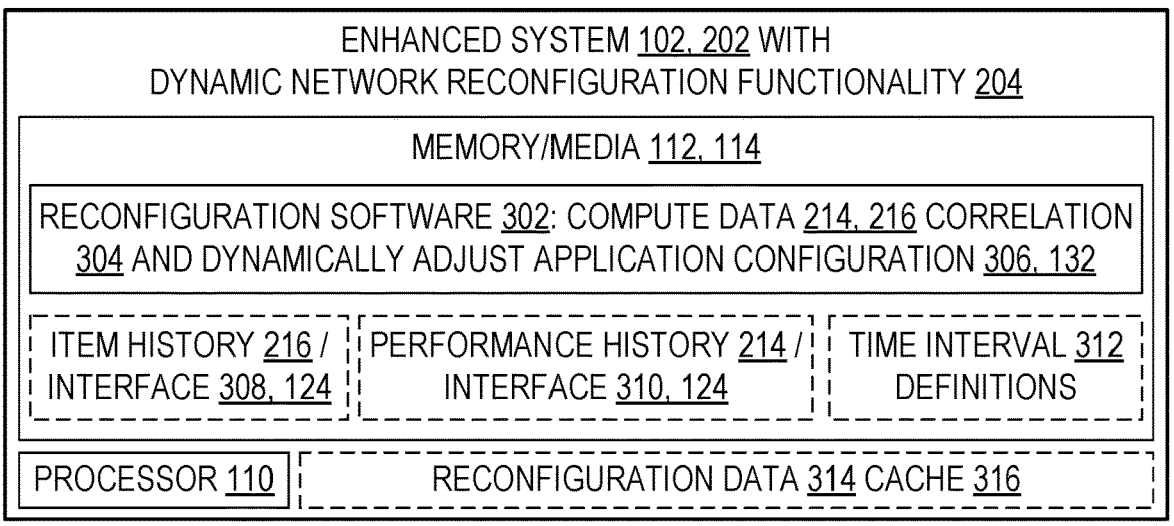
FIG. 3 is a block diagram illustrating aspects of a system enhanced with dynamic network reconfiguration functionality.

FIG. 3 shows some aspects of some enhanced systems 202. This is not a comprehensive summary of all aspects of enhanced systems 202 or all aspects of dynamic network reconfiguration functionality 204. Nor is it a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some additional aspects of dynamic network reconfiguration embodiments. This is not a comprehensive summary of all additional aspects of dynamic network reconfiguration. FIG. 4 items are discussed at various points herein, and additional details regarding them are provided in the discussion of a List of Reference Numerals later in this disclosure document.

FIG. 5 shows some additional aspects and examples of dynamically reconfigurable items 134, also referred to as dynamically adjustable configuration items 134 or dynamically adjustable configuration values 134. This is not a comprehensive summary of all configuration items. FIG. 5 items are discussed at various points herein, and additional details regarding them are provided in the discussion of a List of Reference Numerals later in this disclosure document.

Figure 6:
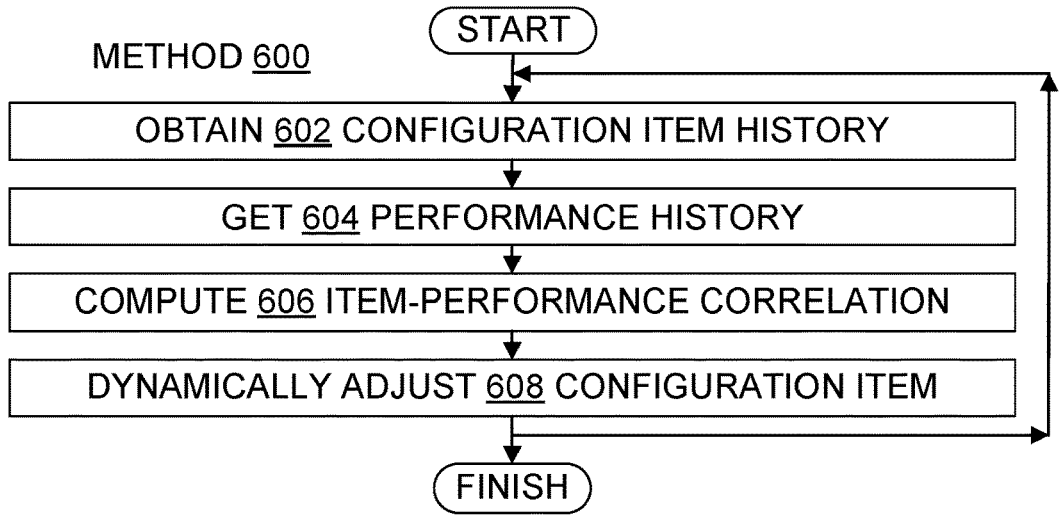
FIG. 6 is a flowchart illustrating steps in a dynamic network reconfiguration method.
Figure 7:
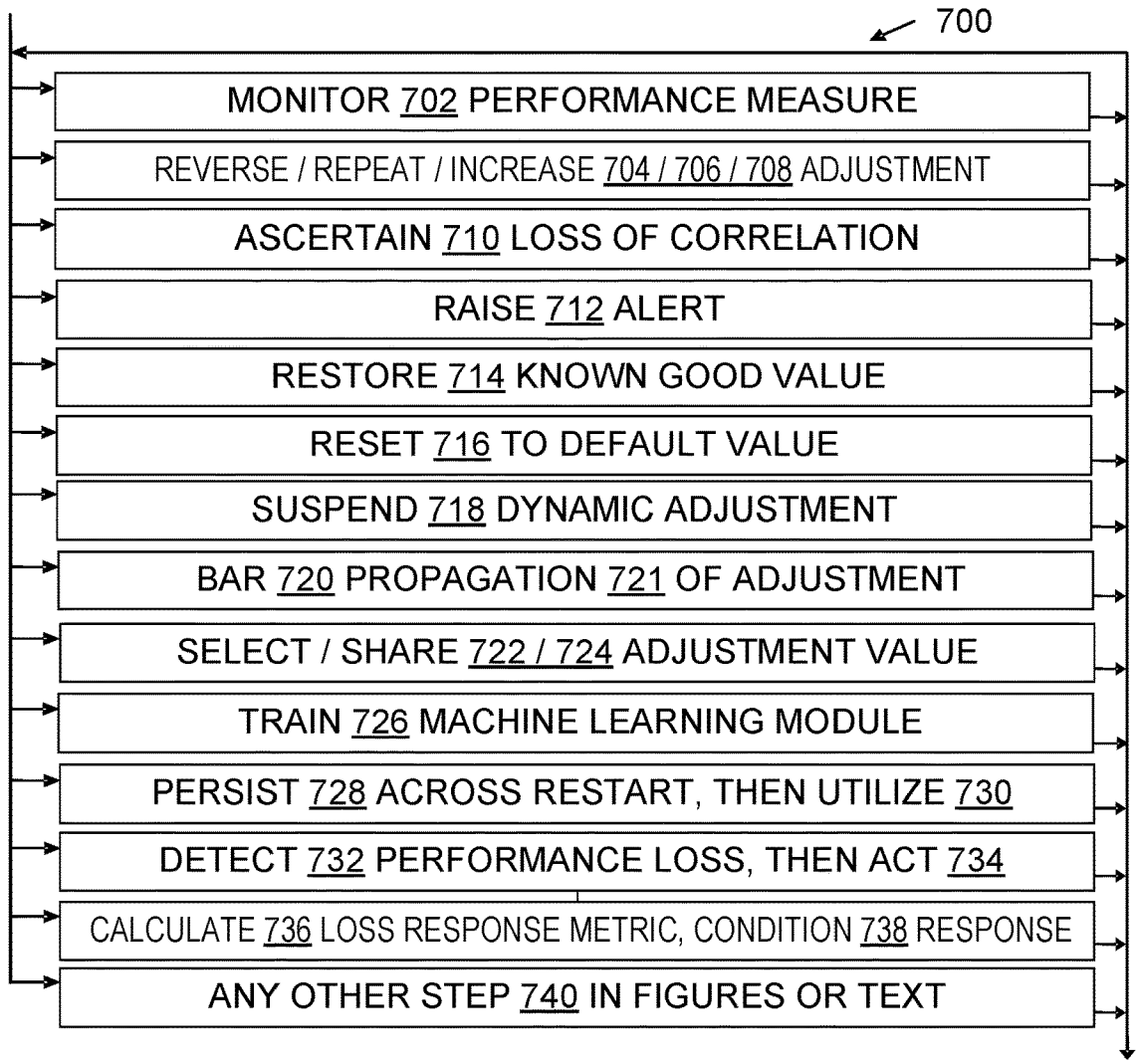
FIG. 7 is a flowchart further illustrating steps in some dynamic network reconfiguration methods, and incorporating FIG. 6.

The other figures are also relevant to systems 202. FIGS. 6 and 7 illustrate methods of functionality 204 operation in systems 202.

In some embodiments, the enhanced system 202 is networked through an interface 124. In some, an interface 124 includes hardware such as network interface cards, software such as network stacks, APIs, or sockets, combination items such as network connections, or a combination thereof.

Some embodiments include a computing system 202 which is configured to reconfigure an application 130 on a node 210 in a network 108. The computing system includes a digital memory 112, and a processor set 110 including at least one processor, the processor set in operable communication with the digital memory. The system 202 also includes: a dynamically adjustable configuration item 134 of the application, residing in the digital memory; an item history interface 308, 124 which upon execution by the processor set provides access to a configuration item history 216 containing values of the dynamically adjustable configuration item; a performance history interface 310, 124 which upon execution by the processor set provides access to a performance history 214 containing values of a performance measure; and an application reconfiguration software 302 which, upon execution by the processor set, computes 606 an item-performance correlation value 304 based on at least a portion of the configuration item history and at least a portion of the performance history, and in response to the item-performance correlation value dynamically adjusts 608 the dynamically adjustable configuration item of the application.

Some embodiments include a reconfiguration data cache 316, which contains at least one of: a current value of any configuration item 134 of the application (whether it be a dynamically adjustable configuration item 134 or a configuration item 134 that is not dynamically adjustable); a history 216 of values of any configuration item 134 of the application; a history 216 of adjustments 410 to values of any configuration item of the application; an application context 434 including at least one of: a temporal location 440, a spatial location 442, a load value 436, or an environmental value 438; or an application health value 428.

Some embodiments include a reconfiguration data cache 316, wherein the reconfiguration data cache shares 724 reconfiguration data 314 between at least one of: application instances 480 which have the same application context; application instances 480 which have sufficiently similar application contexts 434 according to a predefined measure of sufficiency 458 under a specified application context similarity measure 456; applications 130 located in different nodes 210 (whether they are instances of the same application or of different applications, or a mixture); applications 130 located in different containers 460 (whether they are instances of the same application or of different applications, or a mixture); applications 130 located in different pods 462 (whether they are instances of the same application or of different applications, or a mixture); applications 130 which have the same application type 466 (whether they are instances of the same application or of different applications, or a mixture); or only applications 130 which are located in a particular data center 464.

Some embodiments include a multi-level reconfiguration data cache 316, wherein the multi-level reconfiguration data cache organizes reconfiguration data 314 hierarchically in a multi-level hierarchy 468, and wherein the multi-level hierarchy is characterized by at least one of: the multi-level hierarchy includes a pod level 470, a node level 470, and a cluster level 470; the multi-level hierarchy includes an application type level 470, a node level 470, and a cluster level 470; the multi-level hierarchy includes an application level 470, a pod level 470, a node level 470, and a cluster level 470; the multi-level hierarchy includes a pod level 470, a machine level 470, and a cluster level 470; the multi-level hierarchy includes an application type level 470, a node level 470, a cluster level 470, and a data center level 470; the multi-level hierarchy includes an application level 470, a pod level 470, a node level 470, a cluster level 470, and a data center level 470; or the multi-level hierarchy includes a pod level 470, a machine level 470, a cluster level 470, and a data center level 470. Although for convenience the same reference numeral 470 is applied to different kinds of levels, it does not follow that the same level is meant or that the same kind of level is meant by every use of reference numeral 470. A pod level 470 is different than a node level 470, and each of those levels is different than a cluster level 470, and so on.

Some embodiments include a multi-level reconfiguration data cache 316, wherein the multi-level reconfiguration data cache organizes reconfiguration data 314 hierarchically in a multi-level hierarchy 468, and wherein the multi-level hierarchy 468 is characterized by at least one of: each level 470 contains a kind of shared reconfiguration data that is not stored in any other level 470 of the multi-level hierarchy; each level above a lowest level contains an aggregation 474 of reconfiguration data from the level below; or at least one level 470 contains an aggregation 474 of reconfiguration data from applications 130 of a given application type 466 that are located on different nodes 210. Aggregations help reduce memory consumption.

In some embodiments, the dynamically adjustable configuration item 134 includes at least one of: a max endpoints hedging value 502, 504 representing a maximal number of endpoints 512 to utilize in attempts to reach a service 482; an endpoint order hedging value 506, 504 representing a selection order 484 of endpoints; a retry interval value, 508, 510; a max retries value 528, 510 specifying a maximum number of allowed retry attempts; a retry switch endpoint value 514, 510 specifying an interval between trying without success to communicate with a first endpoint and then switching to try communication with a second endpoint instead; a timeout interval 516; a maximum concurrent requests bulkhead value 520 specifying a maximum number of concurrent requests 486 allowed; a circuit breaker threshold value 526; or a circuit breaker 524 policy parameter value 522.

In some embodiments, the dynamically adjustable configuration item 134 includes a hedging resilience strategy item 504, such as a set of one or more endpoints, a maximal number of endpoints taken into account for further attempts of reaching a dependency service, an endpoint connection attempt order, a selection criterion of endpoints given an available set of endpoint, a communications hedging schedule or delay, or another parameter of a communications hedging policy 530. Endpoint selection can be weighted or uniformly assigned.

In some embodiments, the dynamically adjustable configuration item 134 includes a retry resilience strategy item 510, such as a retry interval (or a rule that computes the retry interval on a context basis, such as based on the attempt index or response from the destination), a number defining the max allowed retry attempts, an interval between trying without success to communicate with a first endpoint and then switching to try communication with a second endpoint instead, or another parameter of a communications retry policy 530.

In some embodiments, the dynamically adjustable configuration item 134 includes a timeout resilience strategy item 516, such as a timeout interval, or another parameter of a communications timeout policy 530.

In some embodiments, the dynamically adjustable configuration item 134 includes a bulkhead resilience strategy item 518, such as a max number of concurrent requests allowed, a number of queued requests allowed to wait to be executed when the concurrency limit is reached, or another parameter of a communications bulkhead policy 530.

In some embodiments, the dynamically adjustable configuration item 134 includes a circuit breaker resilience strategy item 524, such as a circuit breaker threshold, breaking interval, evaluation interval, minimal evaluated samples count, or another parameter of a communications circuit breaker policy 530.

In some embodiments, the dynamically adjustable configuration item 134 includes a parameter of a communications load balancing policy 530, a parameter of a service cost budgeting policy 530, a communications concurrency parameter, a reserve capacity parameter, an incoming limit communications parameter, an outgoing limit communications parameter, or a resource utilization parameter.

Other system embodiments are also described herein, either directly or derivable as system versions of described processes or configured media, duly informed by the extensive discussion herein of computing hardware.

Although specific dynamic network reconfiguration architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of dynamic network reconfiguration functionality, for example, as well as different technical features, aspects, mechanisms, software, expressions, operational sequences, commands, data structures, programming environments, execution environments, environment or system characteristics, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 6 and 7 each illustrate a family of methods 600 and 700 respectively, which are performed or assisted by some enhanced systems, such as some systems 202 or another dynamic network reconfiguration functionality enhanced system as taught herein. Method family 600 is a proper subset of method family 700.

Some variations on FIG. 6 exclude obtaining 602 a configuration item history when one is already accessible, or exclude getting 604 a performance history when one is already accessible, or exclude both step 602 and step 604. Some variations on FIG. 6 utilize a set of configuration items, or a set of performance measures, or both, instead of a single configuration item and a single measure of performance (a measure being latency, throughput, etc.) in the computation 606 of a correlation 304. Some variations on FIG. 6 adjust 608 a set of configuration items rather than adjusting 608 only a single configuration item. These variations are not fully exclusive of one another; they are combined in some embodiments. These are also merely examples of variations; as noted elsewhere, any operable combination of steps that are disclosed herein may be part of a given embodiment.

FIGS. 1 to 5 illustrate dynamic network reconfiguration system 202 architectures with implicit or explicit actions, e.g., executing kernels 120 and applications 130, sending and receiving data over network connections, logging computational states and actions (including creating and maintaining histories 214, 216), or otherwise processing data 118, in which the data 118 includes, e.g., network communications, variable values, cache content, telemetry, and settings, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types a command to run an application 130. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 7. FIG. 7 (including incorporated FIG. 6) is a supplement to the textual examples of embodiments provided herein and the textual descriptions of embodiments provided herein. In the event of any alleged inconsistency, lack of clarity, or excessive breadth due to an aspect or interpretation of FIG. 7, the text of this disclosure shall prevail over that aspect or interpretation of FIG. 7.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 700 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 7 to be non-operable, the sequence S is not within the scope of any claim. Any assertion otherwise is contrary to the present disclosure.

Some embodiments provide or utilize a dynamic network reconfiguration method 700 performed by a computing system 202, also referred to as a method of reconfiguring an application on a node in a network, with the understanding that the application has a dynamically adjustable configuration item. In this discussion and generally elsewhere herein, "method" is used in the legal sense and "process" is used in the computer science sense. The method includes automatically and proactively: obtaining 602 a configuration item history 216 containing values of the dynamically adjustable configuration item 134 over a configuration item history time interval 402; getting 604 a performance history 214 containing values of a performance measure 406 over a performance history time interval 404, the performance history time interval overlapping the configuration item history time interval; computing 606 an item-performance correlation value 304 based on at least a portion of the configuration item history and at least a portion of the performance history; and in response to the item-performance correlation value, dynamically adjusting 608 the dynamically adjustable configuration item. The phrase "automatically and proactively" means the method does not include any human activity.

An implicit or explicit goal of the adjustment 608 is typically to improve performance 212 of the application 130. However, adjustment 608 may also or instead have a goal of improving the performance of a different portion of the network 108, such as a remote service 482 or a different application on a neighboring node 210. In some situations, adjustments 608 are made until performance degrades, in order to help find a configuration item 134 value at which performance stops improving or degrades.

In some embodiments, the method 700 includes monitoring 702 the performance measure before the dynamically adjusting 608 and after the dynamically adjusting 608. Then, in response to a result of the monitoring, this method at least partially reverses 704 the dynamically adjusting, or repeats 706 the dynamically adjusting, or increases 708 the dynamically adjusting.

In some embodiments, the method 700 includes ascertaining 710 a loss 422 of correlation 304 between dynamic adjustments to the dynamically adjustable configuration item and values of the performance measure. The ascertaining 710 is based on at least N item-performance correlation values and a predetermined threshold 526, N being greater than one. In response to the loss of correlation, this method 700 performs at least one of: raising 712 an alert 412 which documents the loss of correlation, restoring 714 the dynamically adjustable configuration item to a previous known good value 414, resetting 716 the dynamically adjustable configuration item to a default value 418, suspending 718 dynamic adjustment 410 of the dynamically adjustable configuration item, or barring 720 further propagation 721 of a value of the dynamically adjustable configuration item. In some embodiments, performance of each correlation loss response action is conditioned 738 on a respective potentially different threshold 526 of correlation loss 422. In some embodiments, the respective correlation loss thresholds are themselves configurable items 134.

In some embodiments, the method 700 includes selecting 722 a dynamic adjustment value based on a predetermined rule 420, the predetermined rule being dependent on at least the item-performance correlation value 304, and then dynamically adjusting 608 the dynamically adjustable configuration item to match the selected dynamic adjustment value.

In some embodiments, a rule 420 embodies performance-based selection criteria, as well as a strict interval of allowed values. In some embodiments, both discrete and continuous variables are restricted, in accordance to the type of value. For example, a circuit breaker break interval is a time interval of X seconds, which is a continuous variable that can take values between (0, X_max), whereas a retry count is an integer Y, which is a discrete variable that can take values between [0, Y_max] where Y-max is either finite or an implementation of an unbound infinite value.

In some embodiments, dynamically adjusting 608 the dynamically adjustable configuration item includes selecting 722 a dynamic adjustment value and adjusting 608 the dynamically adjustable configuration item to match the selected dynamic adjustment value, and the selecting 722 is performed at least in part by a machine learning module 408.

In some embodiments, the method 700 includes training 726 the machine learning module, and the training is characterized by at least one of: supervised learning 478 based on at least historical health measurement data 428; supervised learning 478 based on at least application latency data 432; training 726 a back-propagation neural network 444 of the machine learning module 408 based on at least an application context 434, the application context including at least one of: a temporal location 440, a spatial location 442, a load value 436, or an environmental value 438; or training 726 a back-propagation neural network 444 of the machine learning module 408 based on at least a target health metric 426 value 446.

In some embodiments, the training 726 uses configuration items 134 and corresponding performance data 214 as training data. Some embodiments use supervised learning while others use unsupervised learning. Supervised learning in some embodiments leverages historical data to help ensure the module algorithm targets ideal values of health measurements 428. For example, training may leverage application quality of service (successful responses/total response) and target 100% quality of service. In some training 726, application latency 430 is identified based on historical average latency 432 and is allowed within a threshold 526, while CPU consumption during maximal incoming traffic intervals does not exceed 90%.

In some embodiments, a back-propagation neural network 444 takes the application context 434 of an application and ideal values of the health metrics 426. In this example, the neural network 444 training aims to have the neural network 444 output the values for a configuration state 132 of the application, which includes the set of configurable properties 134 and their values at a given time T.

In some embodiments, the method 700 includes persisting 728 reconfiguration information 314 across a restart 490 of the application 130, and utilizing 730 at least a portion of the persisted reconfiguration information to configure 132 or reconfigure 208 the application after the restart.

In some embodiments, the method 700 includes detecting 732 a performance loss 448 within a predetermined adjustment assessment interval 312 after dynamically adjusting the dynamically adjustable configuration item. In response to the performance loss detection, this method performs 734 a performance loss response action 454. The loss response action includes at least one of: raising 712 an alert 412 which associates the performance loss with the dynamic adjustment, restoring 714 the dynamically adjustable configuration item to a previous known good value 414, resetting 716 the dynamically adjustable configuration item to a default value 418, or suspending 718 dynamic adjustment of the dynamically adjustable configuration item.

In some embodiments, the method 700 includes conditioning 738 a performance 734 of the loss response action 454 on a result of calculating 736 a loss response action metric. For example, in some cases an alert is raised only when the loss exceeds a specified threshold, in some the item 134 is reset to a known good value only when the loss exceeds a specified threshold, and so on.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as a performance history 214, a configuration item history 216, reconfiguration software 302, a performance-configuration correlation 304, application type 466, and application context 434, in the form of data 118 and instructions 116, read from a removable storage medium 114 and/or another source such as a network connection, to form a configured storage medium. The configured storage medium 112 is capable of causing a computer system 202 to perform technical process steps for providing or utilizing dynamic network reconfiguration functionality 204 as disclosed herein. The Figures thus help illustrate configured storage media embodiments and process (a.k.a. method) embodiments, as well as system and process embodiments. In particular, any of the method steps illustrated in FIG. 6 or 7, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 700 of reconfiguring an application 130 on a node 210 in a network 108, the application having a dynamically adjustable configuration item 134. This method 700 includes: computing 606 an item-performance correlation value 304 based on at least a portion of a configuration item history and at least a portion of a performance history, and in response to the item-performance correlation value, dynamically adjusting 608 the dynamically adjustable configuration item.

In some embodiments, the method includes dynamically adjusting 608 a predefined percentage 476 of active applications of a specified application type 466 across multiple nodes 210 within a cluster 472. In some embodiments, the percentage 476 of applications being adjusted 608 is itself adjusted, e.g., decreased 704 or increased 708, in response to a change in the correlation 304.

In some embodiments, computing 606 the item-performance correlation value 304 is performed at least in part by a machine learning module 408.

In some embodiments, the dynamically adjustable configuration item 134 includes at least one of: a max endpoints hedging value 502 representing a maximal number of endpoints 512 to utilize in attempts to reach a service 482; an endpoint order hedging value 506 representing a selection order 484 of endpoints; a maximum concurrent requests bulkhead value 520 specifying a maximum number of concurrent requests 486 allowed; a circuit breaker 524 threshold value 526; or a circuit breaker policy parameter value 522.

In some embodiments, the method includes persisting 728 the dynamically adjustable configuration item in a reconfiguration data cache 316 which is shared by at least one of: application instances 480 which have the same application context 434; or application instances 480 which have sufficiently similar application contexts 434 according to a predefined measure of sufficiency 458 under a specified application context similarity measure 456.

Additional Observations

Additional support for the discussion of dynamic network reconfiguration functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Some embodiments utilize or provide dynamic configuration of inter-node communication resilience mechanisms 204 in a distributed system 202.

As an overview, to respond to a customer request a microservice 482 typically calls several other microservices. An error condition in any one of these calls could result in the entire request failing. To guard against this, microservices sometimes implement one or more resilience policies 530 to attempt to recover from failure. These include static policies, for example a policy rule to retry a specific number of times with a specific delay between the retries. However, when used on a global scale, this static nature results in suboptimal behaviors in performance, e.g., overall robustness or cost or throughput or latency. Dynamic reconfiguration functionality 204 addresses these shortcomings by allowing a system to adapt to changing conditions to improve the overall results.

Some embodiments utilize or provide dynamic adjustment of hedging parameters. A system 202 dynamically updates strategies for connecting using multiple endpoints, based on recent history. For example, given a partially ordered list of endpoints, the system 202 reconfiguration algorithm dynamically determines the total order in which the endpoints are contacted. The timing parameters that control how fast different secondary endpoints are invoked are adjusted 608 dynamically based on observed latencies in order to control the overall latency and costs.

Some embodiments utilize or provide dynamic adjustment of retry parameters. A system 202 dynamically adjusts 608 a retry delay based on recent history for this endpoint, spanning more than the current connection attempt. If retry failures are high, software 302 lengthens the time in between attempts up to a maximum. When failure rates drop, software 302 lowers the delay.

Some embodiments utilize or provide dynamic adjustments based on resource utilization for all policies. Based on resource utilization (CPU, memory, etc.), a system 202 adjusts 608 parameters for resilience policies. By adjusting the policies to lower the number of pending requests, resource requirements are lessened. When resources become available, the number of pending requests is raised 608 to reduce failure rates. As to a bulkhead isolation queue size (or a max concurrent requests count which can be configured together with the queue size, or in isolation), allowing 608 fewer requests in a queue reduces resources used. As to retry attempts based on resource availability, allowing 608 fewer retries means requests fail out sooner, releasing resources. As to length of timeouts, shortening 608 timeouts reduces the number of requests that are queued. As to sensitivity of circuit breakers, short circuiting and failing requests lessen load, releasing resources.

Some embodiments utilize or provide dynamic health checks. If a service's dependencies are experiencing high failure rates or report themselves as unhealthy, some systems 202 automatically report the service as unhealthy so traffic can be redirected while the system recovers, being rejected by the unhealthy instance.

Some embodiments utilize or provide a persistent policy state 314 or other system state 132. The adjusted policy behavior is preserved on multiple levels 470 so that new pods 462 (for example) learn the system state 132 quickly. Locally, state is persisted 728 across pod restarts. In a distributed system 202, state is applied to new pods, e.g., during autoscaling.

Some embodiments utilize or provide dynamic global policy management as part of functionality 204. Connection success or failure and policies applied for specific endpoints are reported to a central system. Indicators are returned to suggest which endpoints 512 are heavily loaded or experiencing errors or high latencies, and which endpoints are healthy. Policies on other nodes are adjusted 608 based on this information. For example, adjustments to hedging (e.g., updating the ordering or delays) are applied based on other nearby nodes reporting connectivity issues.

Some embodiments utilize or provide one or more failsafe mechanisms 488. By automatically applying dynamic policy changes, a system 202 sometimes enters a worse state than before. Some software 302 measures metrics to evaluate if the behavior 212 improved or worsened and applies a failsafe reset to the initial state or a previously noted good state if degradation 448 was detected over time. To avoid endless loops of state changes and resets, exceeding a failsafe application threshold 526 determines the system will stay in the failsafe state until it is manually removed from that failsafe state. A system 202 emits metrics that are monitored and alerted 712 on to detect failsafe application.

In some scenarios, some embodiments dynamically adjust a retry delay 508. As a result, the application is not constrained by a retry-after header. For example, after some reconfiguration software 302 determines that a remote service is fast, the software shortens the retries, and skips the first retry, based on the detected conditions. As another example, after some reconfiguration software 302 determines from history data that a second attempt or a third attempt actually never helps, the configuration 132 is adjusted 608 from a default number of three retries, to avoid those nonproductive attempts.

Some embodiments feed some data from a circuit breaker 524 to a bulkhead 518. This allows the reconfiguration software 302 to infer that a remote site 512 is return throttling, and adjust 608 the bulkhead accordingly to reduce load on the remote site. Some embodiments also provide an instance of the reconfiguration software 302 on a given node 210 with performance information from peers of the node in a cluster 472 that are talking to the same server 512.

In some embodiments, reconfiguration software 302 makes adjustments 410 to reduce the CPU usage in a communications pipeline component when that CPU usage is too high. Instead of making another attempt, the component returns a value to the caller indicating excessive attempts by leveraging the parameters of a communication policy 530 such as 524 and 518 which can be combined, or used in isolation. CPU usage is influenced by applying the policy 530.

More generally, some embodiments feed reconfiguration software 302 information about a local system, including CPU, exception rates, other capacity measures, or other performance counters that are indicating high levels of contention on locks. In some scenarios a bulkhead 518 is dynamically adjusted based on the CPU. CPU and other capacity measures are absolute, or normalized, or they are provided as both. For example, in some cases memory capacity is tracked and reported as 25 Mbytes available which corresponds to 10% free.

In some embodiments, reconfiguration software 302 detects unintended adverse consequences of changes 410, and reconfigures 208 to mitigate them. In one scenario, bulkhead max concurrency 520 is increased from one hundred to two hundred, but downstream that leads to a sharply increased contention rate on locks, making the performance change a net negative. Then the software 302 adjusts 608 the bulkhead max concurrency down to fifty, and contention decreases significantly, and overall throughput increases.

In some embodiments, reconfiguration software 302 performs a hill climbing algorithm, as a feedback mechanism monitoring completion rates, throughput rates, power consumption or other cost, or other performance data 214. The software 302 dynamically configures the settings in a communications pipeline to maximize a throughput rating or other metric 452.

In some embodiments, a hedging engine sends a request to different endpoints. In some pipelines, each of these requests originates behind circuit breaker 524 and timeout 516 functions. In some scenarios a pipeline has different instances of a circuit breaker for each endpoint 512 it is attempting to send the request. This has the advantage of allowing isolated dynamic configurations of the circuit breaker to be applied on each endpoint, since the overload of one endpoint is not necessarily dependent or similar in other endpoints. In some scenarios, hedging improves performance up to a saturation point but then performance degrades. In some embodiments, reconfiguration software 302 receives data from endpoints the hedging engine is communicating with, which allows the software 302 to select dynamic adjustments to increase throughput. In some scenarios, the software 302 performs or invokes service discovery and client-side load balancing. This allows clients to do load balancing instead of instead of going through an endpoint load balancer.

In some scenarios, an embodiment containing multiple instances of an application 130 dynamically distributes endpoint selections among the instances. Assume there are ten endpoints the application instances could each potentially communicate with. The software 302 picks two endpoints at random for a given instance, and the application instance hedges against those two. The next instance picks (or is assigned) two different endpoints at random. This approach spreads the load between the endpoints due to the randomized uniform selection.

Some embodiments have a failsafe 488 which the software 302 engages in some scenarios, such as when client-side routing anomalies spike. In some situations, the failsafe software 302 reconfigures the pipeline to a previous known good configuration, or to a default configuration. The failsafe configuration may be distributed across multiple application instances, application types, pods, nodes, machines, or clusters, for example, via a cache 316 or other data 314 distribution mechanism. In some embodiments, the signal of the degradation event (which triggers the failsafe configuration) is shared. Consequently, if an application detects that a newer dynamic configuration leads to degradation, it can make other applications aware via the shared cache. Some embodiments avoid triggering a failsafe for only a single application, because a single application entity can encounter a scoped health issue. In these embodiments, a threshold must be met to trigger the failsafe, e.g., a specific % of the total applications detected health degradation, indicating that the latest reconfiguration led to substantial degradation. In some scenarios, a machine learning mechanism 408, 302 detects a latency anomaly, and the software 302 reconfigures and adjusts items 134 to reduce the delay, e.g., using back propagation for neural networks. As part of a failsafe reconfiguration, some embodiments raise alerts indicating that the failsafe has been engaged.

In one example scenario, an application 130 is configured with a static hedging rule to seek stock market information from a primary source 482, 512, and if the primary source does not respond within three seconds, to then seek the stock market information from a backup source 482, 512. However, this static rule configuration misses an optimization opportunity when the primary source performance degrades by some amount but not by enough to trigger the static rule's switch to the backup source, e.g., when an average primary source response time degrades from a half second to two-and-a-half seconds and the backup source would have responded with the desired stock market information in one second. When the application is making dozens of stock market information requests, this additional delay seriously degrades the user experience, and could even cost the user financially.

More generally, predefined static rules governing configuration 132 will not be optimal in every actual situation. Dynamic reconfiguration functionality 204 may also miss some optimizations, but it will detect and respond to situations that are not covered by the static rules, so it is a technological improvement over static rules, particularly over human-specified fixed policy rules. By avoiding human intervention, functionality 204 makes configuration changes faster and more reliable, e.g., less subjective and more data-based.

Dynamic reconfiguration functionality 204 is also operable and effective in scenarios where human intervention in configurations 132 is not feasible, e.g., when a thousand or more items 134 are being adjusted 608 within a minute, or when adjustments 608 to one or more items 134 occur at least once per second. In these scenarios, attempts at human intervention will slow system performance to a relative crawl, in transaction processing systems, transactions will likely be lost due to the human intervention.

Similarly, functionality 204 is also better than human intervention at experimenting productively with configuration item values 134. For instance, some software 302 randomly changes a time setting 312, 508, 516, and based on a result 214, 304, the software 302 reverses 704, repeats 706, or increases 708 that adjustment to optimize performance or computational cost.

In some scenarios, dynamic reconfiguration functionality 204 also makes beneficial yet counterintuitive dynamic changes. For example, decreasing requests to a service in order to improve performance can sometimes cause a ping increase which degrades performance. This will be detected and corrected by functionality 204 in some embodiments. Increasing requests to improve performance is counterintuitive but is beneficial in this situation.

Moreover, because dynamic reconfiguration functionality 204 utilizes a feedback loop, performance monitoring, correlation tracking, or other ongoing activity, as opposed to simply triggering a static rule, the dynamic reconfiguration functionality 204 in the example above will detect when the primary source of stock market information is healthy again and return the system to the earlier configuration by undoing the hedging parameter change. This is advantageous in the example scenario because the average response time for the healthy primary is half a second whereas the average response time for the backup service is one second, which is one reason it is the backup and not the primary. In a variation, the primary is not always faster but is less expensive than the backup, so reverting to the primary when it is healthy benefits the user financially.

In some embodiments, reconfiguration data 314 is shared between locations (instances 480, pods 462, clusters 472, etc.). In some embodiments, adjusted 608 configuration values 134 replace corresponding default values 418 in new deployments.

In some disfavored approaches, communication parameters such as retry intervals, endpoint connection orders, bulkhead settings, and other parameters are static, or modified only by people (e.g., via traffic manager tools), or modified only by a predefined fixed rule. By contrast, some embodiments taught herein utilize or provide dynamic reconfiguration of network nodes to improve communications resilience. In some embodiments, dynamic network reconfiguration functionality 204 provides better resilience, faster responsiveness to changing conditions, and greater efficiency, by tracking correlations between communication parameters and performance, and then making parameter changes 410 automatically and proactively.

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as monitoring 702 computing system performance, adjusting 608 computing system configuration settings 134, and training 726 a machine learning module 408, which are each an activity deeply rooted in computing technology. Some of the technical mechanisms discussed include, e.g., machine learning modules 408, history interfaces 308, 310, networks 108, caches 316, services 482, and a failsafe mechanism 488. Some of the technical effects discussed include, e.g., performance optimization in situations when static rules 420 for configuration optimization are not triggered, performance optimization in situations when manual configuration changes are not feasible due to their lack of speed or the large number of items 134 to adjust or both, distribution 724 of configuration optimizations across multiple locations, persistence 728 of configuration optimizations across application restarts, and transition 488 to default or known configurations when automated optimization failure is detected 732 via correlation loss 422 or performance loss 448 or both. Thus, purely mental processes and activities limited to pen-and-paper are clearly excluded. Other advantages based on the technical characteristics of the teachings will also be apparent to one of skill from the description provided.

One of skill understands that dynamic network reconfiguration is a technical activity which cannot be performed mentally, because it requires reading and writing data in a computing system memory 112. This data includes, for example, configuration settings 134 and performance data 214, 428. As disclosed herein, some embodiments also involve training 726 a machine learning module 408 or communicating electronically 722 or 606 with a machine learning module 408, which cannot be performed mentally or manually. Moreover, mental or pen-and-paper activity cannot configure a computing system to a failsafe 488 state as described herein, or to any other state 132 for that matter. One of skill also understands that attempting to perform reconfiguration 208 manually would create unacceptable delays in program execution, and would introduce a severe risk of human errors that can cause programs to crash. People manifestly lack the speed, accuracy, memory capacity, and specific processing capabilities required to perform dynamic network reconfiguration.

In particular, network reconfiguration is a part of computing technology, because networks are a part of computing technology and different network configurations cause networks to operate differently. Hence, the network reconfiguration improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as reconfiguration software 302, cache 316 control software 302, or resilience policy 530 implementation software 302.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas, they are not.

Rather, the present disclosure is focused on providing appropriately specific embodiments whose technical effects fully or partially solve particular technical problems, such as how to improve network communications resilience, how to persist or distribute beneficial networked application configuration changes, how to improve hedging engine results, and how to detect failure of an automatic proactive reconfiguration mechanism and how to respond to such failure. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, data structures, data selections, naming conventions, notations, control flows, or other implementation choices described herein. Any apparent conflict with any other patent disclosure, even from the owner of the present subject matter, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
    API: application program interface
    BIOS: basic input/output system
    CD: compact disc
    CPU: central processing unit
    DVD: digital versatile disk or digital video disc
    FPGA: field-programmable gate array
    FPU: floating point processing unit
    GDPR: General Data Protection Regulation
    GPU: graphical processing unit
    GUI: graphical user interface
    HTTPS: hypertext transfer protocol, secure
    IaaS or IAAS: infrastructure-as-a-service
    LAN: local area network
    OS: operating system
    PaaS or PAAS: platform-as-a-service
    RAM: random access memory
    ROM: read only memory
    TPU: tensor processing unit
    UEFI: Unified Extensible Firmware Interface
    UI: user interface
    WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 136 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Network reconfiguration operations such as adjusting 608 (i.e., writing a different value) items 134, computing 606 correlations 304, executing 722, 726 machine learning modules 408, and many other operations discussed herein (whether recited in the Figures or not), are understood to be inherently digital. A human mind cannot interface directly with a CPU or other processor, or with RAM or other digital storage, to read and write the necessary data to perform the dynamic network reconfiguration steps 700 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities, it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as adjusting, ascertaining, barring, calculating, computing, conditioning, detecting, distributing, getting, hedging, increasing, monitoring, obtaining, persisting, raising, repeating, resetting, restarting, retrying, reversing, selecting, sharing, suspending, throttling, training, utilizing (and adjusts, adjusted, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms, separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"

104 users, e.g., user of an enhanced system 202

106 peripheral device 108 network generally, including, e.g., LANs, WANs, software-defined networks, clouds, and other wired or wireless networks 110 processor or set of processors; includes hardware 112 computer-readable storage medium, e.g., RAM, hard disks 114 removable configured computer-readable storage medium 116 instructions executable with processor; may be on removable storage media or in other memory (volatile or nonvolatile or both)

118 digital data in a system 102; data structures, values, source code, and other examples are discussed herein 120 kernel(s), e.g., operating system(s), BIOS, UEFI, device drivers; also refers to an execution engine such as a language runtime 122 software tools, software applications, security controls; computational 124 interface generally 126 display screens, also referred to as "displays"

128 computing hardware not otherwise associated with a reference number 106, 108, 110, 112, 114

130 application, also referred to as application program, application software; software running in a network and attempting communication with other software over the network; kernels 120, tools 122, and user-facing software may each form part or all of an application 130; in some embodiments, an application is an instance of executable software, and has an application type 466

132 configuration, also referred to as configuration state; includes the values of multiple variables 134 which influence or control communication over a network; also refers to the computational activity of configuring a system 134 configuration item, namely, variable which influences or controls communication over a network; at least one but not necessarily all of the configuration items 134 in a given embodiment are dynamically adjustable configuration items 134; also referred to as reconfigurable items or properties or settings or values 136 cloud, also referred to as cloud environment or cloud computing environment 202 enhanced computing system, i.e., system 102 enhanced with functionality 204 as taught herein 204 dynamic network reconfiguration functionality (also referred to as "functionality 204", "dynamic configuration of inter-node communication resilience mechanisms functionality", or "dynamic reconfiguration functionality"), e.g., software or specialized hardware which performs or is configured to perform steps 606 and 608, or step 710 with regard to correlation 304, or step 726 with history 214 and history 216 data as training data, or steps 728 and 730 with reconfiguration data 314, or method 600, or any software or hardware which performs or is configured to perform a novel method 700 or a computational network reconfiguration activity first disclosed herein 206 dynamic, as opposed to static; during execution of an application after the application has been initialized 208 reconfiguration, as opposed to an initial configuration of an initialized application 210 network node; a virtual machine or a physical machine; in some embodiments a node has one or more pods 462; each virtual machine runs on a physical machine, and a physical machine has one or more multiple virtual machines 212 performance, also referred to as behavior, e.g., computational resource consumption, computational throughput or output, computational health; as represented digitally in a computing system; performance refers, e.g., to the efficiency of a system in given conditions, e.g., system computational resources consumption such as CPU requested to handle a unit of an action 214 performance history, also referred to as performance data, e.g., ordered sequence or timestamped set of performance values of a computing system or computational component thereof; digital 216 configuration history, also referred to as configuration item history, e.g., ordered sequence or timestamped set of configuration item values 134 or configurations 132 of a computing system or computational component thereof; digital 302 reconfiguration software, also referred to as application reconfiguration software, software 302, and in particular examples as failsafe software or machine learning mechanism; software which implements functionality 204

304 correlation, also referred to as item-performance correlation or performance-configuration correlation; statistically significant and statistics-based correlation between histories 214 and 216, or correlation between histories 214 and 216 identified with at least a predefined threshold level of confidence by a machine learning module trained on histories 214 and 216; digital; an item-performance correlation value indicates a level of correlation between the configuration item history and the performance history; depending on the embodiment, it is a binary (e.g., yes they correlate or no they do not correlate) or it is capable of holding multiple values that indicate respective strength or weakness of the correlation (e.g., correlation on a scale of zero to one)

306 configuration 132 of a particular application 130

308 interface to an item history 216, e.g., an API 310 interface to a performance history 214, e.g., an API 312 time interval generally, as represented in a computing system; e.g., start time and duration, start time and end time, number of processor cycles, number of transactions, etc.

314 reconfiguration data, e.g., old and new item 134 values, or new item values alone, or either of the foregoing plus timestamps; in some cases has associated metadata such as application type 466, cluster ID, hierarchy level ID, etc.; digital; also referred to as policy state or reconfiguration information 316 cache, e.g., memory 112 allocated for storage of reconfiguration data; cache is typically shared between multiple cache users, e.g., multiple instances of an application or multiple applications of different types or at different locations in a network; digital and computational 402 configuration item history 216 time interval; an example of an interval 312; defines a set or subset of a configuration item history 216

404 performance history 214 time interval; an example of an interval 312; defines a set or subset of a performance history 214

406 performance measure, e.g., computational measure or metric of performance 212; some examples of a performance measure in some embodiments include latency, retry count, throughput, completion rate, health metrics, exception rate, lock contention rate, and resource utilization metrics such as CPU usage or memory usage or bandwidth usage 408 machine learning module; computational 410 dynamic adjustment, e.g., a description of a particular adjustment 608 or a set of particular adjustments 608; also referred to as change 410

412 alert in a computing system 414 known good value of an item 134; an example of a failsafe value 416

416 failsafe value; also known as fall back value; digital 418 default value of an item 134; an example of a failsafe value 416; a default value is not necessarily also a known good value when circumstances have changed from the initial launch of the application 420 predetermined rule involving an item 134, as represented and implemented in a computing system 422 correlation loss; loss of correlation 304 between dynamic adjustments to the dynamically adjustable configuration item and values of the performance measure, as detected when the correlation passes a predefined low threshold or drops a predefined percent or a predefined amount 424 computational health, as represented in a computing system 426 computational health metric 428 computational health measurement data, e.g., the latency metric 426 produced data 428 indicating that the service node is not healthy 424

430 latency in a computing system 432 data representing latency in a computing system 434 application context, as represented in a computing system; depending on the embodiment, an application context 434 includes one, two, three, four, or all five of: a temporal location 440, a spatial location 442, a load value 436, an environmental value 438, or an application health value 428; some embodiments use an application context 434 to delimit the scope of reconfiguration data 314 sharing 724 so that only instances 480 likely to benefit from adjustments 410 receive those adjustments 436 computational load, e.g., requests per minute, as represented in a computing system 438 environmental value in a computing system, e.g., kernel 120 type, type or size of virtual machine 440 temporal location, e.g., day of the week, hour, etc., as represented in a computing system 442 spatial location, e.g., data center a node resides in, pod an application resides in, etc., as represented in a computing system 444 back-propagation neural network 446 target value, not necessarily present in a history; digital 448 performance loss, also referred to as degradation of performance 452 metric associated with routine or other code that responds to a performance loss 454 computational action that responds to a performance loss; routine or other code which performs that action upon execution 456 routine or other code which measures similarity of two application contexts 434, e.g., checking whether they have the same application type, same application name, same cluster ID, or the like 458 extent or sufficiency of similarity between application contexts 434; context similarity determines for example whether reconfiguration data is shared by two application instances, based on the similarity of their contexts (insufficient similarity prevents sharing)

460 container, in a computing sense; virtualizes kernel 462 pod, in a computing sense; in some embodiments, a pod is a set of one or more applications; when a pod includes multiple applications, those applications are of one or more application types 464 data center; a set of multiple physical machines at a geographic location 466 application type, e.g., producer vs consumer, user-facing or not, on local machine or not, perpetual vs created-on-demand, or any other category defined in a system 202

468 hierarchy having applications 130 as members, as defined in a computing system 470 level in a hierarchy 468

472 cluster, in a computing sense; in some embodiments, a cluster is a set of one or more nodes 474 aggregation, e.g., summary or sampling; digital 476 percentage, as represented in a computing system 478 supervised machine learning 480 instance of an application, e.g., copy of application's executable code 482 service or microservice in a network 108

484 selection order, as represented in a computing system 486 request to or from an application 103 as communicated on a network 108 or as queued for communication on a network 108

488 failsafe mechanism, also referred to as failsafe; 488 also refers to computational action of transitioning to a failsafe value 416

490 application restart; computational 502 max endpoints hedging value; digital 504 hedging value generally, e.g., whether hedging is used, or a value which defines hedging behavior; digital 506 endpoint order hedging value; digital 508 retry interval; digital 510 retry item 134 generally; also refers to retry policy (a.k.a. retry strategy); digital 512 network communication endpoint; also referred to as remote site or server 514 retry switch endpoint value; digital 516 timeout generally, as represented in a computing system 518 bulkhead in a computing system; a bulkhead increases application resilience by sending/receiving concurrent requests that can fail independently; in a bulkhead pipeline, elements of an application are isolated into pools so that if one fails, the others will continue to function; the name comes from the sectioned partitions (bulkheads) of an ocean-going ship's hull; also refers to bulkhead items 134

520 maximum concurrent requests bulkhead value; digital 522 circuit breaker 524 policy parameter; digital 524 circuit breaker in a computing system; a circuit breaker allows a service to continue operating when a related service fails, thereby preventing the failure from cascading and giving the failing service time to recover 526 circuit breaker threshold; digital 528 max retries cap; digital 530 communications policy, as represented in a computing system 600 flowchart; 600 also refers to dynamic network reconfiguration methods that are illustrated by or consistent with the FIG. 6 flowchart or any variation of the FIG. 6 flowchart described herein 602 computationally obtain a configuration item history or access to a configuration item history, e.g., by obtaining a copy of the history or using an API 604 computationally get a performance history or access to a performance history, e.g., by obtaining a copy of the history or using an API 606 computationally (that is, not mentally or on paper) compute a correlation 304, e.g., by statistical calculations or by using a trained machine learning module 608 computationally dynamically adjust (change) a configuration item 134, e.g., by directly writing a variable in memory 112 that represents the item or by invoking an API; "dynamically adjusting" an item in a node means changing the item's value after the node has begun running and after the item has received an initial value, and before the node is terminated or crashed or deleted; also referred to as specific examples such as raising, allowing, shortening, etc.

700 flowchart; 700 also refers to dynamic network reconfiguration methods that are illustrated by or consistent with the FIG. 7 flowchart, which incorporates the FIG. 6 flowchart and other steps taught herein, and methods that are illustrated by or consistent with any variation of the FIG. 7 flowchart described herein 702 computationally monitor a performance measure 704 computationally reverse an item adjustment or its result 706 computationally repeat an item adjustment or its result 708 computationally increase an item adjustment or its result 710 computationally ascertain a correlation loss, e.g., by detecting correlation below a defined threshold, or detecting a defined absolute or percentage drop in correlation 712 computationally raise an alert 714 computationally restore an item 134 to a known good value 716 computationally reset an item 134 to a default value 718 computationally suspend dynamic adjustment, e.g., for a specified duration or until a specified condition is met in a computing system 720 computationally bar propagation of an adjustment 410, e.g., by removing the adjustment from a cache or from a persistence 728 mechanism 721 propagation in a computing system from one application instance to another 722 computationally select a new value for an item 134, e.g., randomly, or using a machine learning model recommendation, or based on trends detected in histories 214 and 216, or using a hill climbing algorithm 724 computationally share a new value for an item 134, e.g., via a cache 726 computationally train a machine learning module 408

728 computationally persist a value for an item 134, e.g., via a modification of a default value file, or a command line parameter 730 computationally utilize an item 134 during execution of an application, e.g., to control concurrency or an interval 312

732 computationally detect a performance loss, e.g., by detecting performance below a defined threshold, or detecting a defined absolute or percentage drop in performance 734 computationally respond (act upon) a performance loss 736 computationally (that is, not mentally or on paper) calculate a loss response metric 738 computationally condition a response 734 upon a loss size or upon prior or concurrent execution of another response 734

740 any step or item discussed in the present disclosure that has not been assigned some other reference numeral; 740 may thus be shown expressly as a reference numeral for various steps or items or both, and may be added as a reference numeral (in the current disclosure or any subsequent patent application which claims priority to the current disclosure) for various steps or items or both without thereby adding new matter Conclusion Some embodiments automatically and proactively adjust network device configuration settings 134 during network operation, based on correlations 304 between device performance 212 and device configuration 132. Correlations are computed 606 using statistics routines or computed 606 by a machine learning module 408. Some embodiments share 724 adjusted configuration values via a cache 316, and some persist 728 adjusted values through an application restart. In some embodiments, the cache 316 is hierarchical 468 and different kinds of reconfiguration data 314 are shared at different levels 470. In some embodiments, the configuration value 134 is shared 724 only between application instances 480 that have sufficiently similar contexts 434. Some embodiments detect 710 a correlation loss 422 and fall back 488 to a known good configuration setting 414 or a default configuration setting 418. Some embodiments optimize network 108 internode communications by making 608 dynamic adjustments 410 which are not available from static configuration settings or from static configuration rules.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of reconfiguring an application on a node in a network, the application having a dynamically adjustable configuration item, the method comprising automatically and proactively:
   obtaining a configuration item history containing values of the dynamically adjustable configuration item over a configuration item history time interval;
   getting a performance history containing values of a performance measure over a performance history time interval, the performance history time interval overlapping the configuration item history time interval;
   computing an item-performance correlation value based on at least a portion of the configuration item history and at least a portion of the performance history;
   in response to the item-performance correlation value, dynamically adjusting the dynamically adjustable configuration item;
   based on at least N item-performance correlation values and a predetermined threshold, N being greater than one, ascertaining a loss of correlation between dynamic adjustments to the dynamically adjustable configuration item and values of the performance measure; and
   in response to the loss of correlation, performing at least one of: raising an alert which documents the loss of correlation, restoring the dynamically adjustable configuration item to a previous known good value, resetting the dynamically adjustable configuration item to a default value, suspending dynamic adjustment of the dynamically adjustable configuration item, or barring further propagation of a value of the dynamically adjustable configuration item.

2. The method of claim 1, further comprising monitoring the performance measure before the dynamically adjusting and after the dynamically adjusting, and then, in response to a result of the monitoring:
   at least partially reversing the dynamically adjusting;
   repeating the dynamically adjusting; or
   increasing the dynamically adjusting.

3. The method of claim 1, further comprising dynamically adjusting the dynamically adjustable configuration item based on at least an application context, the application context comprising at least one of: a temporal location, a spatial location, a load value, or an environmental value.

4. The method of claim 1, comprising selecting a dynamic adjustment value based on a predetermined rule, the predetermined rule being dependent on at least the item-performance correlation value, and then dynamically adjusting the dynamically adjustable configuration item to match the selected dynamic adjustment value.

5. The method of claim 1, wherein dynamically adjusting the dynamically adjustable configuration item comprises selecting a dynamic adjustment value and adjusting the dynamically adjustable configuration item to match the selected dynamic adjustment value, and wherein the selecting is performed at least in part by a machine learning module.

6. The method of claim 5, further comprising training the machine learning module, the training characterized by at least one of:
   supervised learning based on at least historical health measurement data;
   supervised learning based on at least application latency data;
   training a back-propagation neural network of the machine learning module based on at least an application context, the application context comprising at least one of: a temporal location, a spatial location, a load value, or an environmental value; or
   training a back-propagation neural network of the machine learning module based on at least a target health metric value.

7. The method of claim 1, further comprising persisting reconfiguration information across a restart of the application, and utilizing at least a portion of the persisted reconfiguration information to configure or reconfigure the application after the restart.

8. The method of claim 1, comprising:
   detecting a performance loss within a predetermined adjustment assessment interval after dynamically adjusting the dynamically adjustable configuration item; and
   in response to the performance loss detection, performing a performance loss response action, the loss response action including at least one of: raising an alert which associates the performance loss with the dynamic adjustment, restoring the dynamically adjustable configuration item to a previous known good value, resetting the dynamically adjustable configuration item to a default value, or suspending dynamic adjustment of the dynamically adjustable configuration item.

9. The method of claim 8, wherein the method comprises conditioning a performance of the loss response action on a result of calculating a loss response action metric.

10. A computing system which is configured to reconfigure an application on a node in a network, the computing system comprising:
   a digital memory;
   a processor set comprising at least one processor, the processor set in operable communication with the digital memory;
   a dynamically adjustable configuration item of the application, residing in the digital memory;
   an item history interface which upon execution provides access to a configuration item history containing values of the dynamically adjustable configuration item;
   a performance history interface which upon execution provides access to a performance history containing values of a performance measure; and
   an application reconfiguration software which, upon execution by the processor set, computes an item-performance correlation value based on at least a portion of the configuration item history and at least a portion of the performance history, and in response to the item-performance correlation value dynamically adjusts the dynamically adjustable configuration item of the application;
   based on at least N item-performance correlation values and a predetermined threshold, N being greater than one, ascertains a loss of correlation between dynamic adjustments to the dynamically adjustable configuration item and values of the performance measure, and in response to the loss of correlation, performs at least one of: raising an alert which documents the loss of correlation, restoring the dynamically adjustable configuration item to a previous known good value, resetting the dynamically adjustable configuration item to a default value, suspending dynamic adjustment of the dynamically adjustable configuration item, or barring further propagation of a value of the dynamically adjustable configuration item;
   wherein the dynamically adjustable configuration item comprises at least one of: an endpoint order hedging value representing a selection order of endpoints, a retry switch endpoint value specifying an interval between trying without success to communicate with a first endpoint and then switching to try communication with a second endpoint instead, a circuit breaker threshold value, or a circuit breaker policy parameter value.

11. The system of claim 10, further comprising a reconfiguration data cache, wherein the reconfiguration data cache contains at least one of:
   a current value of any configuration item of the application;
   a history of values of any configuration item of the application;
   a history of adjustments to values of any configuration item of the application;
   an application context comprising at least one of: a temporal location, a spatial location, a load value, or an environmental value; or
   an application health value.

12. The system of claim 10, further comprising a reconfiguration data cache, wherein the reconfiguration data cache shares reconfiguration data between at least one of:
   application instances which have the same application context;
   application instances which have sufficiently similar application contexts according to a predefined measure of sufficiency under a specified application context similarity measure;
   applications located in different nodes;
   applications located in different containers;
   applications located in different pods;
   applications which have the same application type; or
   only applications which are located in a particular data center.

13. The system of claim 10, further comprising a multi-level reconfiguration data cache, wherein the multi-level reconfiguration data cache organizes reconfiguration data hierarchically in a multi-level hierarchy, and wherein the multi-level hierarchy is characterized by at least one of:
   the multi-level hierarchy comprises a pod level, a node level, and a cluster level;
   the multi-level hierarchy comprises an application type level, a node level, and a cluster level;
   the multi-level hierarchy comprises an application level, a pod level, a node level, and a cluster level;
   the multi-level hierarchy comprises a pod level, a machine level, and a cluster level;
   the multi-level hierarchy comprises an application type level, a node level, a cluster level, and a data center level;
   the multi-level hierarchy comprises an application level, a pod level, a node level, a cluster level, and a data center level; or
   the multi-level hierarchy comprises a pod level, a machine level, a cluster level, and a data center level.

14. The system of claim 10, further comprising a multi-level reconfiguration data cache, wherein the multi-level reconfiguration data cache organizes reconfiguration data hierarchically in a multi-level hierarchy, and wherein the multi-level hierarchy is characterized by at least one of:
   each level contains a kind of shared reconfiguration data that is not stored in any other level of the multi-level hierarchy;
   each level above a lowest level contains an aggregation of reconfiguration data from the level below; or
   at least one level contains an aggregation of reconfiguration data from applications of a given application type that are located on different nodes.

15. The system of claim 10, wherein a second dynamically adjustable configuration item comprises a max endpoints hedging value representing a maximal number of endpoints to utilize in attempts to reach a service.

16. A computer-readable storage device configured with data and instructions which upon execution by a processor cause a computing system to perform a method of reconfiguring an application on a node in a network, the application having a dynamically adjustable configuration item, the method comprising:
   computing an item-performance correlation value based on at least a portion of a configuration item history and at least a portion of a performance history;
   in response to the item-performance correlation value, dynamically adjusting the dynamically adjustable configuration item;
   based on at least N item-performance correlation values and a predetermined threshold, N being greater than one, ascertaining a loss of correlation between dynamic adjustments to the dynamically adjustable configuration item and values of a performance measure;

in response to the loss of correlation, performing at least one of: raising an alert which documents the loss of correlation, restoring the dynamically adjustable configuration item to a previous known good value, resetting the dynamically adjustable configuration item to a default value, suspending dynamic adjustment of the dynamically adjustable configuration item, or barring further propagation of a value of the dynamically adjustable configuration item; and utilizing reconfiguration data organized hierarchically in a multi-level hierarchy which includes at least an application type level or is characterized in that each level above a lowest level contains an aggregation of reconfiguration data from the level below, or both.

17. The computer-readable storage device of claim 16, wherein the method comprises dynamically adjusting a predefined percentage of active applications of a specified application type across multiple nodes within a cluster.

18. The computer-readable storage device of claim 16, wherein computing the item-performance correlation value is performed at least in part by a machine learning module.

19. The computer-readable storage device of claim 16, wherein the dynamically adjustable configuration item comprises at least one of:

a max endpoints hedging value representing a maximal number of endpoints to utilize in attempts to reach a service;

an endpoint order hedging value representing a selection order of endpoints;

a maximum concurrent requests bulkhead value specifying a maximum number of concurrent requests allowed;

a circuit breaker threshold value; or a circuit breaker policy parameter value.

20. The computer-readable storage device of claim 16, wherein the method further comprises persisting the dynamically adjustable configuration item in a reconfiguration data cache which is shared by at least one of:

application instances which have the same application context; or application instances which have sufficiently similar application contexts according to a predefined measure of sufficiency under a specified application context similarity measure.

* * * * *